(No Model.) 3 Sheets—Sheet 1.
C. J. KURTZ.
FRUIT DRIER.
No. 515,343. Patented Feb. 27, 1894.
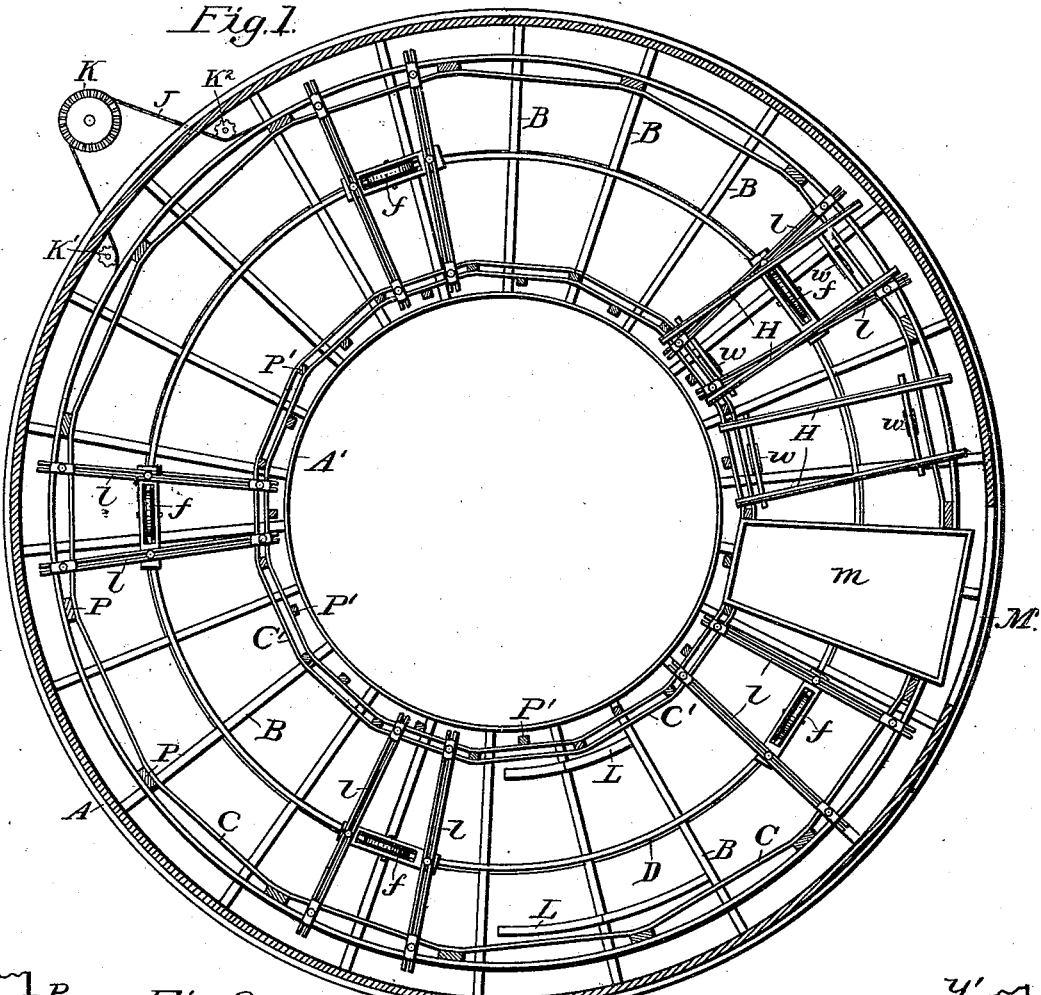
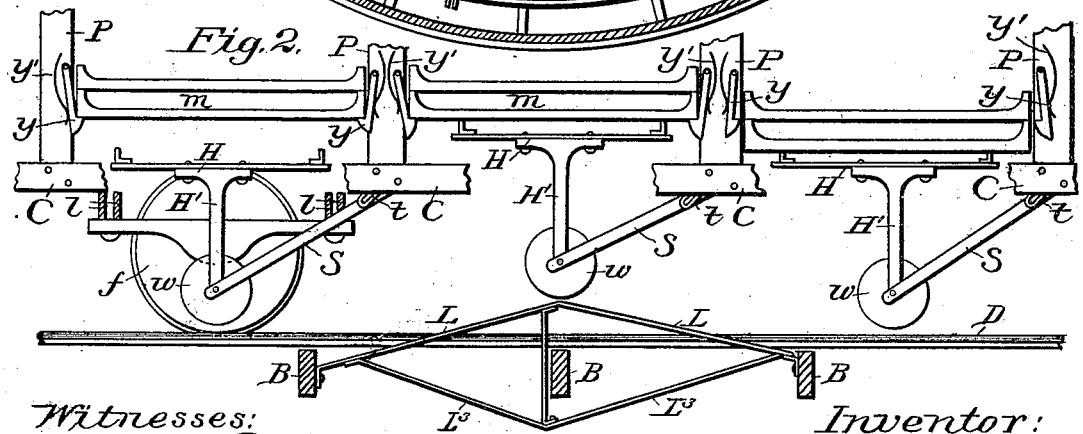
Witnesses:
Friedrich Kurtz
Frank Smith
Inventor:
Clinton J. Kurtz (No Model.)  
C. J. KURTZ.  
FRUIT DRIER.
No. 515,343. Patented Feb. 27, 1894.
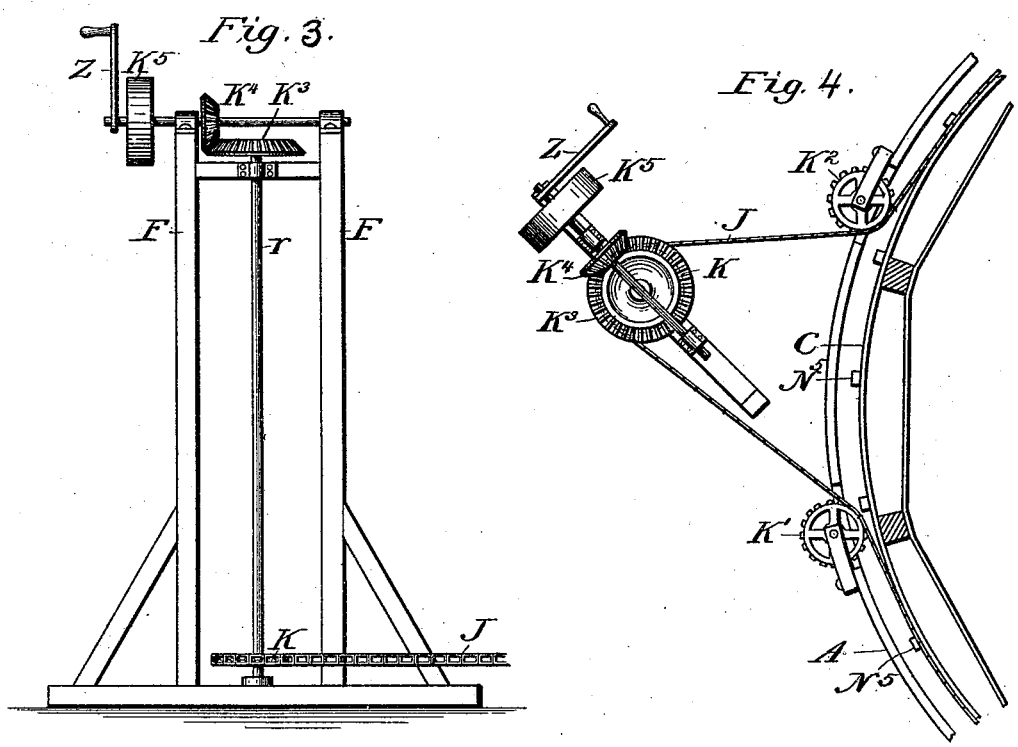
Witnesses:  
Friederich Kurtz  
Frank Smith
Inventor:  
Clinton J. Kurtz (No Model.) 3 Sheets—Sheet 3.

C. J. KURTZ.
FRUIT DRIER.

No. 515,343. Patented Feb. 27, 1894.

Witnesses:
Friederich Kurtz
Frank Smith

Inventor:
Clinton J. Kurtz

UNITED STATES PATENT OFFICE.

CLINTON J. KURTZ, OF SALEM, OREGON.

FRUIT-DRIER.

SPECIFICATION forming part of Letters Patent No. 515,343, dated February 27, 1894.

Application filed March 1, 1893. Serial No. 464,275. (No model.)

*To all whom it may concern:*

Be it known that I, CLINTON J. KURTZ, a citizen of the United States, residing at Salem, in the county of Marion and State of Oregon, have invented a new and useful Improvement in Fruit-Driers, of which the following is a specification.

My invention pertains to fruit driers, and more particularly to the automatic revolving class. My purpose is to construct a drier, each revolution of which shall be accompanied by the elevation automatically of a complete row of trays containing in such manner that the newly filled trays may be inserted under, instead of upon, those which have previously been put in. In other driers the fresh fruit trays are superposed on those which have been put in position so that when the drier is full the bottom and top fruit is over dried and the middle trays either partially or almost unaffected. The result in my drier is such that when the last row of trays is being inserted the top ones are completely dried and can be removed. The drier may thus be continuously refilled and a constant process continue from bottom to the top; time is economized and immense quantities of fruit may be evaporated. A further purpose accomplished consists in the fact that the fruit in being elevated and revolved is brought into contact with all the degrees of temperature of the drying chamber, so that the fruit is not variable in perfection, and is not withered and hardened by the process, being preserved in a more moist and natural condition. I accomplish these results by the mechanism illustrated in the accompanying drawings, in which like parts are designated by similar letters of reference throughout the several views.

Figure 5:
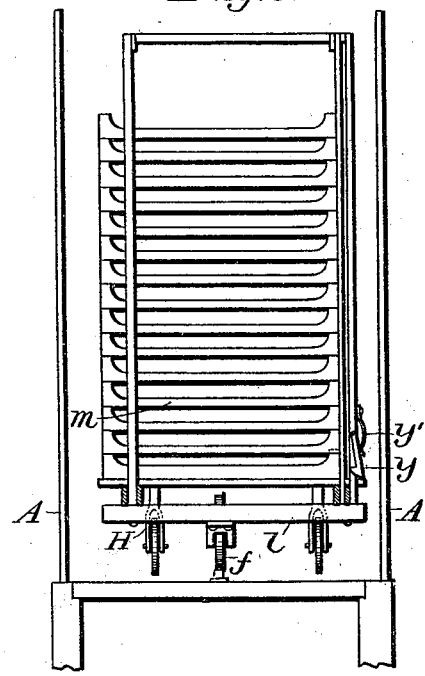
Figure 6:
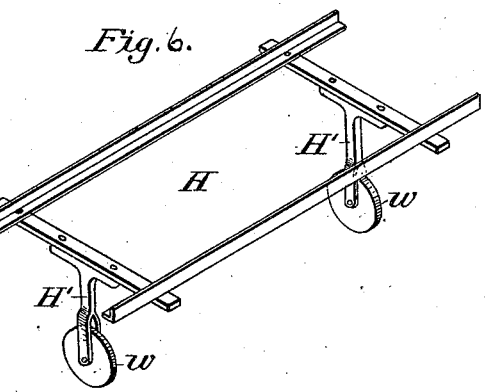
Figure 7:
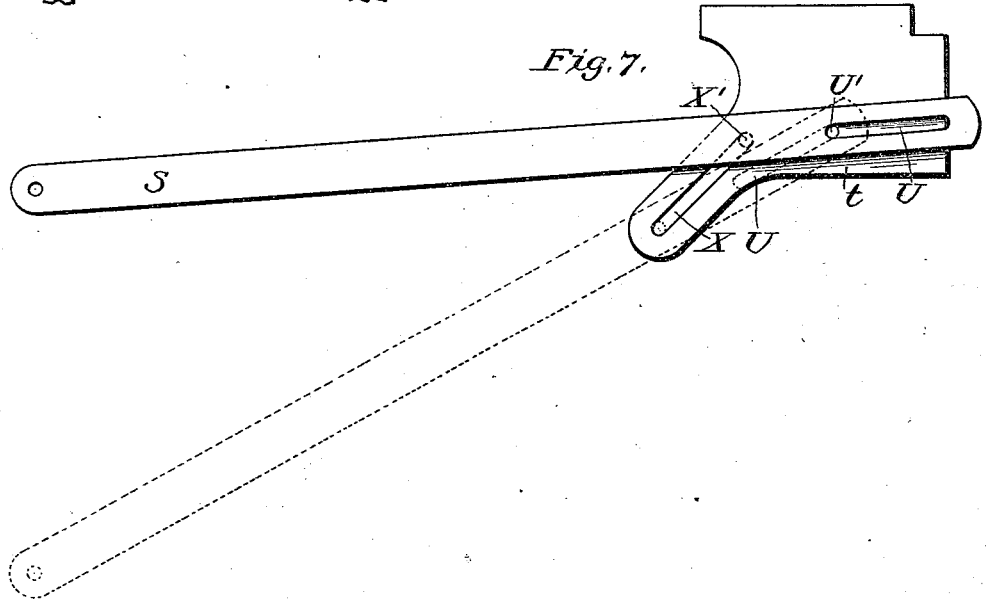

Figure 1, is a sectional view of the drier at its base. Fig. 2, is a view of carrier track, tray truck, several trays and bridge. Fig. 3, is a vertical detailed view of wheels, chain and crank arm by which motion is communicated to the drier. Fig. 4, is a plan view of same parts and their connections with the drier. Fig. 5, is a vertical sectional view showing a reverse of trays, tray truck, and carrier track. Fig. 6, is a detailed view of a tray truck. Fig. 7, is a detailed view of guide lever and guide bar, by which the tray truck is sustained in a horizontal position when being elevated, showing relative positions of lever.

Referring now to these illustrations in detail: A. A. represent the outer and A' A' the inner inclosure of the drying chamber, into the base of which the heat may be conducted from the furnace by pipes or in other suitable manner. The foundation upon which the drier rests may be constructed of brick or other suitable material, across tops of the foundation which should consist of two circular walls corresponding to the walls of the drying chamber, extend across supports B B upon which, about midway is secured the carrier track D upon which the weight of the revolving parts of the machine rests, and upon which they revolve.

P. P. designate the upright supports which guide and include the trays.

C designates the outer and C' the inner iron frame secured to uprights P. P. and constitute bottom supports of the carrier by which term I mean the entire mechanism which carries the fruit and trays and trucks, and which revolve upon the track D.

$l. l.$ designate cross bars secured to frame C and C' by clamps and bolts to which at center are secured carrier wheels and trucks $f. f.$ H designates the tray truck, $w. w.$ traytruck wheels, H' H' tray truck axle shank. S guide lever, $t$ guide bar, X. a slot in guide bar, "U" a slot in guide lever and X' a guide bolt on guide bar.

$m. m.$ are trays which may be simply of wood with meshed wire bottoms to permit the heat to pass through them.

Y. Y are catches and Y' Y' springs, the former attached to uprights P and P'; Z a crank for use of hand, $K^5$ a belt wheel by which motion may be communicated to carrier. $K^3$ and $K^4$ intersecting cog wheels operating upon shafts R.

J is a reel chain guided by sprocket wheels

K' and K² and engaging with notches, N⁵ and N⁵ on frame C. by which chain is held in position and the carrier turned. Sprocket K² may be adjusted on frame C so as to tighten or loosen tension of reel chain as desired.

L. L. designate the bridge over which wheels w. w. run.

M' designates a door through which the trays can be inserted.

The operation of my invention is as follows: Motion is communicated by crank arm or belt to sprocket wheels and reel chain J and the carrier revolves upon track D. Through door M, trays containing the fruit are placed upon tray trucks as shown at M, until the first row around has been filled. Upon the next revolution, wheels w w pass over bridge L L as shown in Fig. 2. Tray trucks and trays are elevated by the bridge lever bar U and lever S of the construction shown, and cause the tray trucks to sustain a horizontal position, and to rise vertically, being guided by uprights P P and P'. Catches Y Y engage the under edge of trays and hold them in position. Another row of trays is now inserted and elevated in like manner. When not in motion on bridge L L tray trucks H H, rest upon frame C and C'.

I am aware that revolving fruit driers have been constructed but I am familiar with none that elevate the fruit in a manner similar to mine, at the same time demanding so small power.

What I claim as new, and desire to secure by Letters Patent, is—

1. In a fruit drier, a drying chamber included by walls A and A' cross supports B B. track D. trucks ƒ ƒ. carrier truck bars l l. iron frame C and C' vertically movable tray trucks H H. for elevating the trucks automatically, trays m m. substantially as specified.

2. In a fruit drier, the drying chamber included by walls A and A' the shafts and gearing, cross supports, carrier track, trucks and vertically movable tray trucks, guide lever S guide bar t, trays m m, catches y. y. springs y' y', bridge L L, by which the trays may be raised successively as and for the purpose specified.

3. In a fruit drying chamber the combination with a circular frame and means for revolving the same of a series of tray trucks mounted on wheels, an inclined bridge for successively elevating the trucks and springs and catches for holding the trays in place when lifted, substantially as described.

CLINTON J. KURTZ.

Witnesses:
FRIEDERICH KURTZ,
ANDREW KURTZ.